(12) United States Patent
Lim et al.

(10) Patent No.: US 12,431,259 B2
(45) Date of Patent: Sep. 30, 2025

(54) CONDUCTIVE PARTICLE, CONDUCTIVE MATERIALS AND CONNECTION STRUCTURE

(71) Applicant: Duksan Neolux Co., Ltd, Cheonan-si (KR)

(72) Inventors: Yeong Jin Lim, Cheonan-si (KR); Kyung Heum Kim, Cheonan-si (KR); Chang Wan Bae, Cheonan-si (KR); Hyeon Yun Jeong, Cheonan-si (KR); Seok Won Jeong, Cheonan-si (KR); Hyun Sang Cho, Cheonan-si (KR); Kyung Soo Kim, Cheonan-si (KR)

(73) Assignee: Duksan Neolux Co., Ltd, Cheonan-si (KR)

( * ) Notice: Subject to any disclaimer, the term of this patent is extended or adjusted under 35 U.S.C. 154(b) by 0 days.

(21) Appl. No.: 18/777,588

(22) Filed: Jul. 19, 2024

(65) Prior Publication Data
US 2025/0029747 A1    Jan. 23, 2025

(30) Foreign Application Priority Data

Jul. 20, 2023  (KR) .......................... 10-2023-0094716

(51) Int. Cl.
*H01B 1/22* (2006.01)
*B22F 1/18* (2022.01)
*C08J 3/12* (2006.01)

(52) U.S. Cl.
CPC ................. *H01B 1/22* (2013.01); *B22F 1/18* (2022.01); *C08J 3/126* (2013.01); *C08J 2325/14* (2013.01); *C08J 2339/06* (2013.01)

(58) Field of Classification Search
CPC ..... H01B 1/00; H01B 1/02; H01B 1/22; C09J 9/02; B22F 1/18
See application file for complete search history.

(56) References Cited

U.S. PATENT DOCUMENTS

| | | | |
|---|---|---|---|
| 9,535,006 B2 * | 1/2017 | Yukawa | H01B 1/10 |
| 11,021,616 B2 * | 6/2021 | Paik | C09D 5/24 |
| 2020/0269315 A1 * | 8/2020 | Dobashi | B22F 1/06 |
| 2024/0347225 A1 * | 10/2024 | Kim | C08K 3/08 |

FOREIGN PATENT DOCUMENTS

| | | | | |
|---|---|---|---|---|
| JP | 23105861 | | 6/2011 | |
| KR | 102411476 B1 * | | 7/2022 | H01B 5/14 |
| WO | WO-2015163570 A1 * | | 10/2015 | B22F 1/16 |
| WO | WO-2023090525 A1 * | | 5/2023 | H01B 5/16 |

* cited by examiner

*Primary Examiner* — Mark Kopec
(74) *Attorney, Agent, or Firm* — PnK IP LLC (57) ABSTRACT

A conductive particle to be dispersed in a resin composition of an anisotropic connection material containing binder resin and solvent, the conductive particle includes: a core, a conductive layer provided on the core and containing metal, insulating fine particles connected by a first substituent that binds to the metal of the conductive layer, provided on a first region of the conductive layer, and a hydrophobic surface treatment layer connected by a second substituent that binds to the metal of the conductive layer, provided on a second region of the conductive layer, wherein the first region and the second region do not overlap.

9 Claims, 3 Drawing Sheets

CONDUCTIVE PARTICLE, CONDUCTIVE MATERIALS AND CONNECTION STRUCTURE

CROSS-REFERENCE TO RELATED APPLICATION

This application claims priority from and the benefit of Korean Patent Application No. 10-2023-0094716, filed on Jul. 20, 2023, which is hereby incorporated by reference for all purposes as if fully set forth herein.

BACKGROUND

Field

The present invention relates to a conductive particle having insulating fine particles on its surface, and more specifically to a conductive particle conductive material and connection structure used in anisotropic conductive materials for electrical connection.

Discussion of the Background conductive particles are used as conductive connection materials in anisotropic conductive materials, such as anisotropic conductive films (ACF), anisotropic conductive adhesives (ACA), anisotropic conductive pastes (ACP), anisotropic conductive inks (ACI), and anisotropic conductive sheets (ACS), which are used in a dispersed form within resin.

When used in these anisotropic conductive materials, conductive particles are mixed with curing agents, adhesives, and resin binders and used to maintain electrical connections between upper and lower electrodes through the curing and adhesion of the anisotropic conductive material during pressure/heat application.

Particularly, anisotropic conductive films (ACF) are mainly used in COG (Chip on Glass), FOG (Film on Glass board), and FOB (Film on Board) methods. COG refers to a method of connecting a drive IC chip to an organic substrate, FOG connects a flexible substrate to an organic substrate, and FOB connects a flexible substrate to an epoxy substrate, enabling the exchange of electrical signals.

However, as the resolution of displays increases, the pitch of electrodes decreases. When connecting electrodes between a chip and a substrate in a narrow pitch condition, part of the conductive particles may flow along with the ACF resin, causing short circuits between adjacent electrodes due to the flowing conductive particles connecting the neighboring electrodes.

To solve these issues, methods for forming an insulating layer on the surface of conductive particles have been proposed. The insulating layer can be formed by coating with insulating materials or attaching insulating fine particles to the conductive particle surface. While the former method provides good insulating properties, it has the drawbacks of increased connection resistance between upper and lower electrodes and difficulty in ensuring a uniform coating layer. The latter method, although prone to the detachment of insulating fine particles, offers lower connection resistance and better particle-to-particle insulation properties and has been more commonly used recently.

Therefore, the method of attaching insulating fine particles to the surface of conductive particles generally uses a wet attachment method, where solvent, conductive particles, and insulating fine particles are mixed and dispersed together.

However, when manufacturing conductive particles by attaching insulating fine particles using the wet attachment method, issues arise with the aggregation of multiple conductive particles within the ACF resin.

The aggregation of insulated conductive particles within the ACF leads to additional product defects, making it very difficult to manufacture ACF using insulated conductive particles.

SUMMARY

The technical problem to be solved by the embodiments of the present invention is to provide conductive particles, anisotropic conductive materials, and connection structures that eliminate the aggregation of conductive particles during the manufacturing process of anisotropic conductive materials, despite having insulating fine particles attached to the surface, thereby overcoming the issues of the prior art.

A conductive particle according to a first aspect of the present invention is a conductive particle dispersed in a resin composition of an anisotropic connection material containing binder resin and solvent, comprising a core, a conductive layer provided on the core and containing metal, insulating fine particles connected by a first substituent that binds to the metal of the conductive layer, provided on a first region of the conductive layer, and a hydrophobic surface treatment layer connected by a second substituent that binds to the metal of the conductive layer, provided on a second region of the conductive layer, wherein the first region and the second region do not overlap.

Furthermore, the height of the insulating fine particles can be 100 nm to 300 nm.

The first substituent is preferably at least one selected from the group consisting of hetero groups, ether groups, carbonate groups, and hydroxyl groups, and the second substituent is preferably at least one selected from the group consisting of thiol groups, phosphate groups, and phosphate ester groups.

The conductive layer of the conductive particle may further include protrusions, and in this case, at least one or more insulating fine particles can be formed on the protrusions.

The surface treatment layer can also be formed on the protrusions.

The diameter of the insulating fine particles is preferably longer than the height of the protrusions.

An anisotropic conductive film according to a second aspect of the present invention is an anisotropic conductive film manufactured using the conductive particles, wherein the number of aggregated conductive particles of 5 or more per area of 75 $cm^2$ measured using an optical microscope is 0.2 ppm or less.

A method of preparing a conductive particle according to another aspect of the present invention includes a core providing step, a conductive layer forming step of forming a conductive layer with or without protrusions on the core, an insulating fine particles attaching step of mixing primary intermediate conductive particles prepared in the conductive layer forming step, a solution containing insulating fine particles with a first substituent, and a solvent to attach the insulating fine particles to a first region of the primary intermediate conductive particle, a surface treatment step of mixing a surface treatment material with a second substituent after the insulating fine particles attaching step to form a surface treatment layer on a second region different from the first region of the conductive layer, and a drying step after the surface treatment step.

At this time, the thickness of the conductive layer in the conductive layer forming step can be 80 nm to 400 nm.

Furthermore, the drying step is preferably 100° C. to 200° C.

In the insulating fine particles attaching step, it is preferable that the weight of the insulating fine particles relative to the area of the insulating conductive particle is 5% to 40%.

The conductive particles according to the embodiments of the present invention have the effect of reducing the reactivity between insulating fine particles bonded to the surface of the conductive particle and other conductive particles, thereby preventing the phenomenon of conductive particles sticking to each other during the subsequent drying process of conductive particles, during storage, and during the manufacturing process of anisotropic conductive materials. This eliminates the aggregation of conductive particles, allowing for the manufacture of anisotropic conductive materials and connection structures with low defect rates.

DETAILED DESCRIPTION

Before explaining the present invention in detail, it should be understood that the terms used herein are for describing particular embodiments only and are not intended to limit the scope of the present invention, which is defined only by the appended claims. All technical and scientific terms used herein have the same meaning as commonly understood by one of ordinary skill in the art unless otherwise indicated.

Throughout the present specification and claims, unless otherwise indicated, the term "comprise," and variations thereof, means "including, but not limited to," and is not intended to exclude the presence of other elements, steps, or components.

Moreover, the various embodiments of the present invention may be combined with other embodiments unless specifically indicated otherwise. Any feature described as preferred or advantageous may be combined with other features described as preferred or advantageous.

First Aspect: Conductive Particle

The conductive particle according to the embodiment of the present invention includes a core, a conductive layer provided on the core, insulating fine particles provided on the conductive layer, and a surface treatment layer.

The core is an insulating bead with very low electrical conductivity and can be made of resin fine particles or organic/inorganic hybrid particles. It is used in anisotropic conductive materials and is made of a material that does not break during electrical connection of the conductive particle. In other words, when the conductive particle according to the embodiments of the present invention receives a force within the range for electrical connection between electrodes, the insulating bead inside the conductive particle deforms very well but does not break.

When the insulating bead is made of resin fine particles, the resin fine particles can be copolymers obtained by polymerization methods such as seed polymerization, dispersion polymerization, suspension polymerization, or emulsion polymerization using at least one monomer selected from the group consisting of urethane, styrene, acrylate, benzene, epoxy, amine, and imide monomers, or their modified monomers, or mixtures of these monomers.

When the insulating bead is made of organic/inorganic hybrid particles, it is preferable that the organic/inorganic hybrid particles have a core-shell structure. If the core is organic, the shell is inorganic, and if the core is inorganic, the shell is organic.

In this case, the organic material can be a polymer using the monomers, modified monomers, or mixed monomers used in the aforementioned resin fine particles, and the inorganic material can be oxides (such as $SiO_2$, $TiO_2$, $Al_2O_3$, and $ZrO_2$); nitrides (such as AlN, $Si_3N_4$, TiN, and BaN); or carbides (such as WC, TiC, and SiC). Methods for forming the shell can include chemical coating, Sol-Gel method, spray coating, CVD (Chemical Vapor Deposition), PVD (Physical Vapor Deposition), and plating.

The conductive layer is a layer for imparting conductivity to the conductive particle. The material of the conductive layer of the conductive particle is not limited, but can be composed of one or more elements such as P, B, Cu, Au, Ag, W, Mo, Pd, Co, Pt on a Ni base. For example, the material of the conductive layer can be composed of one alloy component such as Ni—P, Ni—B, Ni—W, Ni—Mo, Ni—Co. Or, the material of the conductive layer can be composed of two alloy components such as Ni—P—Pd, Ni—B—Pd, Ni—P—Co, Ni—B—Co, Ni—P—W, Ni—B—W. Or, the material of the conductive layer can be composed of three alloy components such as Ni—P—Co—Mo, Ni—B—Co—Mo, Ni—P—Pd—W, Ni—B—Pd—W. Additionally, the material of the conductive layer can be composed of four or more alloy components. Also, the conductive layer can be an alloy layer composed of several layers using alloy elements.

The thickness of the conductive layer of the conductive particle is preferably 80 nm to 400 nm. If the thickness of the conductive layer is less than 80 nm, electrical resistance increases during electrical connection, and if it exceeds 400 nm, even if the conductive particle deforms little under the bonding conditions of heating/pressurizing of the anisotropic conductive material, delamination occurs between the conductive layer and the insulating bead, reducing the reliability of the product. A more preferable thickness is 90 nm to 300 nm. An even more preferable thickness is 100 nm to 250 nm.

A precious metal layer containing precious metals such as gold, silver, platinum, and palladium may be provided on the outer surface of the conductive layer of the conductive particle. This is because the precious metal layer can increase the electrical conductivity of the conductive particle and also provide an oxidation prevention effect. Also, in this invention, the method of forming the precious metal layer is not particularly limited. The method of forming the precious metal layer can use conventional known techniques such as sputtering, plating, and deposition.

protrusions may be formed on the surface of the conductive particle to more easily penetrate the oxide film of the electrode, and in this invention, the shape of the protrusions of the conductive particle is not particularly limited. It can be spherical, elongated, or in the form of clusters of multiple particles. The most preferable shape of the protrusions is one that narrows towards the end.

The method of forming protrusions on the surface of the conductive particle is not particularly limited. The protrusions can grow integrally with the conductive layer, or they can be formed by attaching nano-sized particles to the core and then forming the conductive layer. Alternatively, protrusions can be formed by first forming a first conductive layer on the core, attaching nano-sized particles, and then forming a second conductive layer of the same or different material as the first conductive layer.

The size of the protrusions is also not particularly limited. The preferred size of the protrusions is a convex shape of 50 nm to 500 nm. An even more preferable size of the protrusions is 100 nm to 350 nm.

Insulating fine particles are particles formed in the First region on the conductive layer to prevent short circuits between conductive particles and adjacent electrodes when the conductive particle is used as an anisotropic conductive material. If protrusions are provided, they may also be provided on the protrusions.

The material of the insulating fine particles can be insulating resin particles or inorganic particles. The resin particles include at least one or more resins selected from the group consisting of styrene or styrene-based resins containing alkyl groups with one or more carbon atoms, acrylates or methacrylates containing alkyl groups with one or more carbon atoms, and acrylate-based resins containing diacrylate or dimethacrylate at both ends of glycol with one or more carbon atoms. The inorganic particles include one or more materials selected from the group consisting of trimethoxysilane-based materials containing acryl, phenyl, and vinyl groups.

To show an insulating effect, the particle size can be 90 nm or more, but to secure sufficient connection resistance and insulation resistance, 100 nm to 300 nm is preferable, and more preferably 100 nm to 250 nm.

Also, to improve insulation and conduction effects, insulating fine particles of different sizes can be mixed and used, and it is also possible to mix and use organic/inorganic particles.

As a method for attaching insulating fine particles to the surface of the conductive particle, a wet attachment method is used in which Solvent, conductive particle, and insulating fine particles are mixed together. The insulating fine particles are attached to the conductive layer or protrusions of the insulating fine particles by a polymer having a First substituent on the surface that has bonding strength with the metal of the conductive layer of the conductive particle.

The First substituent is any hetero element or substituent that has chemical bonding strength such as covalent bonding, polar bonding, etc., with metals, or has a high affinity for metals and can be physically attached-fixed to the metal surface. Specifically, it is selected from the group consisting of Hetero group, Ether group, carbonate, and Hydroxyl group. The Hetero group preferably includes at least one element selected from the group consisting of sulfur, phosphorus, nitrogen, and oxygen.

At this time, it is preferable that the insulating fine particles are attached to 5 to 40% of the total Area of the conductive layer outer surface (including the outer surface of protrusions if protrusions are present). If the Area to which insulating fine particles are attached is less than 5%, the ratio of insulating particles is low, making it difficult to see an insulation effect, and if it exceeds 40%, the connection resistance increases as the number of insulating fine particles increases. Therefore, even if insulating fine particles are attached, part of the conductive layer outer surface of the conductive particle remains open.

The surface treatment layer is a layer that prevents insulating fine particles on the conductive layer from bonding with insulating fine particles attached to the conductive layer of other conductive particles. It is formed in the Second region on the conductive layer and is not formed in the First region where insulating fine particles are formed.

In other words, the surface treatment layer is provided with a material that has little chemical reaction with insulating fine particles while preventing the surface treatment layer from easily detaching from the Second region by reacting and bonding with the metal of the conductive layer of the conductive particle. This is because if a surface treatment layer is also formed on the surface of insulating fine particles, the surface Area of surface treatment materials formed on the conductive layer of other conductive particles reacting with each other increases during the subsequent drying process, resulting in many Aggregated insulated conductive particles.

As a material for forming the surface treatment layer, a compound can be used that includes at least one substituent selected from the group consisting of Thiol group, Phosphate group, and Phosphate ester group, which are substituents capable of bonding with metals while having hydrophobic characteristics, and includes a hydrophobic hydrocarbon chain with 3 or more carbon atoms.

The hydrophobic hydrocarbon with 3 or more carbon atoms mentioned above can specifically use materials from fatty acid series, or series with alkyl groups or phenol groups. In this case, these materials can more specifically be substances including alkyl groups with 6 to 60 carbon atoms, cycloalkyl groups with 6 to 60 carbon atoms, aryl groups with 6 to 60 carbon atoms, arylalkyl groups with 7 to 60 carbon atoms, alkyl ether groups with 3 to 60 carbon atoms, or substances including structures where two or more of the above materials are chain-linked.

Second Aspect: Method of Preparing a Conductive Particle

Figure 4:
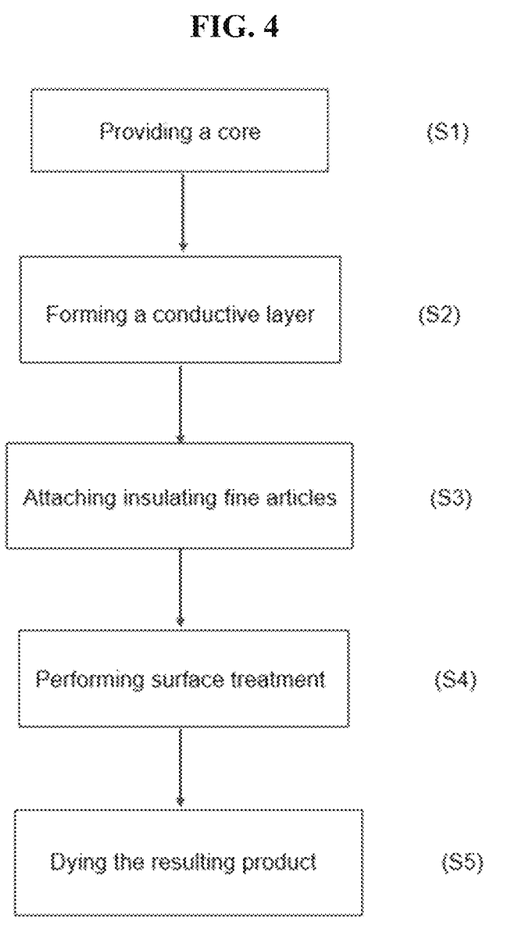
FIG. 4 is a flowchart for describing method of preparing a conductive particle according to an embodiment of the present invention.

FIG. 4 is a flowchart for describing method of preparing a conductive particle according to an embodiment of the present invention. Referring to FIG. 4, method of preparing a conductive particle according to the embodiments of the present invention includes core providing step (S1), conductive layer forming step (S2), insulating fine particles attaching step (S3), Surface treatment step (S4), and drying step (S5).

At this time, core providing step (S1) includes core particle synthesis step (S1a) and plating catalyst activation step (S1b).

core particle synthesis step (S1a) is a step of manufacturing a core by polymerizing a monomer, modified monomer, or a mixture of the monomers such as urethane-based, styrene-based, acrylate-based, benzene-based, epoxy-based, amine-based, and imide-based materials using methods such as seed polymerization, dispersion polymerization, suspension polymerization, or emulsion polymerization.

When the core is a hybrid particle, the core may have a core-shell structure where the core is organic and the shell is inorganic or vice versa. The organic material used can be a polymer using the monomers, modified monomers, or a mixture of the monomers mentioned above, and the inorganic material can include oxides such as $SiO_2$, $TiO_2$, $Al_2O_3$, and $ZrO_2$, nitrides such as AlN, $Si_3N_4$, TiN, and BaN, and carbides such as WC, TiC, and SiC.

Methods for forming the shell can include chemical coating, sol-gel, spray coating, CVD (Chemical Vapor Deposition), PVD (Physical Vapor Deposition), and plating methods.

Additionally, forms where inorganic particles are dispersed in an organic matrix are possible, as well as forms where organic particles are dispersed in an inorganic matrix, and forms where organic and inorganic materials are dispersed in a 50:50 ratio.

For example, the organic material can be dispersed using a solution of ethoxylated triacrylate monomer and ethoxylated diacrylate monomer mixed with solvent and polymerization initiator. This dispersion can include ultrasonic homogenizer processing.

Also, a solution containing a dispersant and surfactant is added to the dispersion treatment solution and polymerized under heating conditions to form the core.

Next, in the plating catalyst activation step (S1b), the core particles prepared in step S1a are activated using an electroless plating catalyst. At this time, the plating catalyst used in the plating catalyst activation step (S1b) can be replaced with small metal or inorganic particles attached to insulating fine particles if they can provide a similar effect.

Specifically, in the plating catalyst activation step (S1b), after treating the surface of the core particles with a surfactant, sensitization treatment is performed using an electroless plating catalyst, followed by pretreatment through various known methods, and the sensitized core particles are activated by immersing them in a solution containing a precursor of the electroless plating catalyst.

The activated core particles are then put into a solution containing a strong acid and stirred at room temperature for acceleration treatment to obtain catalyst-treated core particles for electroless plating.

Next, the conductive layer forming step (S2) with protrusions includes core dispersion step (S2a) and conductive layer forming step (S2b).

In the core dispersion step (S2a), the core is dispersed in an alloy plating solution for forming the conductive layer. The alloy plating solution is prepared by sequentially dissolving precursors of alloy elements, complexing agents, lactic acid, stabilizers, and surfactants.

The prepared plating solution contains the catalyst-treated core particles obtained in step (S1b) and is dispersed using an ultrasonic homogenizer.

The dispersion treatment solution is preferably adjusted to pH 5.5-6.5 using a basic solution such as ammonia water, as this can improve the adhesion and dispersibility of the insulating fine particles and the conductive layer during the initial Ni reduction reaction in the subsequent conductive layer forming step (S2b). If the pH of the dispersion treatment solution is less than 5.5, for example, below pH 4, adhesion and dispersibility are good, but reactivity is too low, potentially leaving some particles unplated. If the pH exceeds 6.5, abnormal Ni deposition can cause the conductive layer surface to become loose, reducing adhesion and dispersibility.

Next, the conductive layer forming process (S2b) is performed to form the conductive layer on the core in the dispersed plating solution. At this time, the number of layers, materials, formation method of the conductive layer, and the formation method of the protrusions are not limited. The thickness of the conductive layer is formed to be 80 to 400 nm, and the protrusions can be integrally formed or separately formed. For example, the protrusions can grow integrally with the conductive layer, or they can be formed by attaching nano-sized particles to the core and then forming the conductive layer. Alternatively, protrusions can be formed by first forming a first conductive layer on the core, attaching nano-sized particles, and then forming a second conductive layer of the same or different material as the first conductive layer.

For example, protrusions can be formed integrally with the conductive layer by adding one or more precursors selected from P and B to the nickel-based alloy plating solution in the core dispersion step (S2a), and then forming a conductive layer with protrusions by sequentially adding alloy elements containing precursors of one or more elements selected from Cu, Au, Ag, W, Mo, Pd, Co, and Pt in the dispersed plating solution in the conductive layer forming step with protrusions (S2b), thereby forming a conductive layer with protrusions having a concentration gradient.

At this time, the alloy elements can be divided and added 2 to 5 times at intervals of 10 to 30 minutes, or 2 to 4 times at intervals of 15 to 25 minutes. The amount added can be divided and added in increasing amounts or continuously added as needed, with the amount of alloy elements added increasing over time to ensure that the concentration of the alloy elements increases towards the ends of the protrusions on the conductive layer surface.

When the concentration of alloy elements increases towards the ends of the protrusions on the conductive layer surface, it can reduce connection resistance during connection and improve connection reliability.

Before and after the divided addition, it is preferable to maintain the pH of the plating solution within a controlled range depending on the type of alloy elements to be added to form the conductive layer with protrusions. For example, when adding precursors of P, it is preferable to maintain the pH within the range of 5.5 to 6.0, and when adding precursors of B, it is preferable to maintain the pH within the range of 8.5 to 9.0. If the pH of the plating solution is too low, the chemical reactivity is low, making it difficult to form protrusions, while if the pH is too high, excessive abnormal deposition of the conductive layer occurs, disrupting the balance of the plating solution and leading to defective plating.

Additionally, applying a heating condition can avoid excessive abnormal deposition during the protrusion formation mechanism, allowing the formation of protrusions with the desired structure.

The insulating fine particles attaching step (S3) is a step of attaching insulating fine particles to the conductive layer. Although both dry and wet methods can be used to attach insulating fine particles to the surface of the conductive particles, the wet method is preferably used in this embodiment. The dry method involves physically impacting insulating fine particles on the surface of the conductive particles at high temperatures, making it difficult to achieve uniform particle attachment.

The wet method involves mixing solvent, conductive particles, and insulating fine particles together in a solvent to attach them. The insulating fine particles are attached to the conductive layer or protrusions by providing substituent groups on the surface of the insulating fine particles that are reactive with the metal of the conductive layer. In other words, the surface of the insulating fine particles is equipped with substituent groups that improve the reactivity with the metal on the surface of the conductive layer or protrusions. Such substituent groups can be selected from the group consisting of hetero groups, thiol groups, carbonate groups, and hydroxyl groups. The hetero groups preferably contain at least one element selected from the group consisting of sulfur, phosphorus, nitrogen, and oxygen.

In addition to having substituents on the surface of the insulating fine particles, the conductive particle surface can also have substituents. In this case, it is preferable for the substituents of the insulating fine particles and the substituents of the conductive particles to have a high binding force.

In the wet method, the insulating fine particles are preferably formed on 5 to 40% of the total area of the outer surface of the conductive layer (including protrusions if present). This is because the insulating fine particles have a surface affinity for the surface of the conductive particles, so they tend not to stick to each other. Therefore, part of the conductive particle surface is open, and the conductive layer is exposed.

At this time, the area occupied by the insulating fine particles on the total area of the outer surface of the conductive layer can be obtained by taking an SEM image of the conductive particle surface with the insulating fine particles attached and calculating it using the following formula.

Attachment Area of insulating fine particles (%)= ((Unit Surface Area of insulating particles× Number of attached insulating particles)/Total Surface Area of conductive particle)×100%  (Equation 1)

Meanwhile, to improve insulation and conduction effects, insulating fine particles of different sizes can be mixed and used, or organic/inorganic particles can be mixed and used.

To make insulating fine particles adhere better to the surface of conductive particles, not only substituents on the surface of insulating fine particles but also substituents on the surface of conductive particles can be used, which can increase the adhesion of insulating fine particles and the Area of insulating fine particles attached to conductive particles.

The surface treatment step (S4) is a step of introducing a surface treatment layer on the surface of conductive particles with attached insulating fine particles to solve the problem of aggregation between conductive particles when insulating fine particles are attached.

Generally, the wet method allows for uniform particle attachment, but subsequent drying of conductive particles is necessary. During this drying process, aggregation may occur between conductive particles with attached insulating fine particles. This aggregation is thought to occur due to the metal-affinity substituents included in the insulating fine particles tending to attach to the conductive layer of other conductive particles. In other words, during the drying process, the substituents of insulating fine particles stick to the surface of other conductive particles where insulating fine particles are not attached, and as time passes after drying, insulating fine particles naturally stick to adjacent conductive particles, ultimately resulting in multiple particles clumping together during ACF manufacturing. Therefore, according to this embodiment, hydrophobic surface treatment is performed on the exposed conductive layer surface of conductive particles, i.e., parts where insulating fine particles are not attached to the surface, after attaching insulating fine particles.

As a material for forming the surface treatment layer, compounds can be used that include at least one substituent selected from the group consisting of Thiol group, Phosphate group, and Phosphate ester group, which are substituents capable of bonding with metals while having hydrophobic characteristics, and include a hydrophobic hydrocarbon chain with 3 or more carbon atoms.

The hydrophobic hydrocarbon with 3 or more carbon atoms can specifically use materials from fatty acid series, or series with alkyl groups or phenol groups. In this case, these materials can more specifically be substances including alkyl groups with 6 to 60 carbon atoms, cycloalkyl groups with 6 to 60 carbon atoms, aryl groups with 6 to 60 carbon atoms, arylalkyl groups with 7 to 60 carbon atoms, alkyl ether groups with 3 to 60 carbon atoms, or substances including structures where two or more of the above materials are chain-linked.

The drying step (S5) is a step of drying conductive particles manufactured by the wet method. Although the drying temperature varies depending on the type of Solvent, it is preferably carried out at 100 to 200° C.

The drying step is a step to dry the Solvent to obtain the desired density and connection resistance of conductive particles when manufacturing anisotropic conductive materials, as conductive particles are in a mixture state with Solvent when insulating fine particles are attached to conductive particles by the wet method.

In the drying step of this invention, as mentioned earlier, a surface treatment layer is formed, so the phenomenon of insulating fine particles attached to the conductive particle surface and the conductive particle surface (conductive layer) without insulating fine particles sticking to each other during the drying process due to the substituents of the attached insulating fine particles hardly occurs, and the phenomenon of adjacent conductive particles and insulating fine particles naturally attaching to each other as time passes after drying does not occur, resulting in multiple particles not aggregating during ACF manufacturing.

In other words, a surface treatment layer with hydrophobic characteristics and substituents capable of bonding with metals is formed on the conductive layer outer surface of conductive particles, preventing the phenomenon of insulating fine particles attaching to the conductive layer of other conductive particles, while the surface treatment layer is not formed on the outer surface of insulating fine particles, thus preventing the formation of many Aggregated insulated conductive particles due to surface treatment materials reacting with each other when the surface treatment layer is formed on the entire outer surface of conductive particles.

Third Aspect: Anisotropic Conductive Material

Anisotropic conductive materials can be manufactured by dispersing the conductive particles of this invention in a resin binder. Examples of anisotropic conductive materials include anisotropic conductive paste, anisotropic conductive film, and anisotropic conductive sheet. After uniformly dispersing the conductive particles in the resin binder, it can be used as an anisotropic conductive paste or spread thinly on the surface of release paper to be used as an anisotropic film.

In this case, the resin binder is not particularly limited. For example, the resin binder can be vinyl resins such as styrene-based, acrylic-based, vinyl acetate-based resins; thermoplastic resins such as polyolefin-based, polyamide-based resins; or curable resins such as urethane-based, epoxy-based resins. Also, the resin can be used alone or in combination of two or more types. Particularly, it is preferable for the resin binder to include monomers of a similar series to the core to exhibit similar behavior in changing temperature environments as the aforementioned core.

For polymerization or curing purposes in the Binder resin, radical initiators such as BPO (Benzoyl Peroxide) or photoinitiators such as TPO (Trimethylbenzoyl Phenylphosphinate), and epoxy-based latent curing agents such as HX3941HP can be used alone or in combination.

Additionally, other substances can be added to the resin binder to the extent that they do not hinder the achievement of this invention's purpose. For example, at least one type of colorant, softener, heat stabilizer, light stabilizer, antioxidant, or inorganic particles can be further added.

Fourth Aspect: Connection Structure

When using the conductive particles described earlier in this invention, the purpose, structure, and materials of the connection structure are not particularly limited. In other words, the connection structure connects circuit boards using the conductive particles or anisotropic conductive materials of this invention. For example, the connection structure is used as a method to electrically connect display driving ICs and FPCs. The connection structure of this invention prevents short circuits between left and right electrodes during bonding, thereby preventing circuit malfunctions.

EXAMPLES

Example 1

Insulating Fine Particles Synthesis Step:

As the first solution, 13.5 g of acrylamide, 108 g of polyvinylpyrrolidone (PVP), 400 g of ethanol, and 3,500 g of di water (DIW) were mixed and added to a 5 L reactor, then dissolved for 30 minutes at 150 rpm using a magnetic stirrer. As the second solution, 125 g of Styrene, 13.5 g of Butyl acrylate, and 15 g of ethylene glycol dimethacrylate (EGDMA) were mixed in a 250 ml beaker, dissolved through 10 minutes of ultrasonic treatment, and then added to the 5 L reactor containing the first solution. The 5 L reactor was then placed in a Water Bath and heated from room temperature to 75° C. over 1 hour at 250 rpm. As the third solution, 1.1 g of potassium persulfate (KPS) (polymerization initiator) and 50 g of di water (DIW) were mixed in a 100 ml beaker, dissolved through 10 minutes of ultrasonic treatment, and then added to the first and second mixed solutions maintained at 75° C. After adding the third solution, polymerization was completed by maintaining 75° C. for 12 hours. After the reaction was completed, the reactor was naturally cooled to room temperature, and aggregates were removed using a 250 Mesh sieve. The insulating particles that passed through the sieve were washed 3 times and purified 3 times using Methanol, and a 5 wt % solution of insulating fine particles was prepared.

The size of the produced insulating fine particles was measured using FE-SEM. The size was 110 nm. The Tg of the produced insulating fine particles was determined using DSC. The Tg was 110° C.

Insulating Fine Particles Attachment Step:

insulating fine particles dispersed in methanol were dispersed for 10 minutes through ultrasonic treatment. Then, 100 g of conductive particles were added to a 2 L reactor, followed by 600 g of methanol. The conductive particles used were PN-T3.25R from Duksan Hi-Metal Co., Ltd., with a size of 3.25 μm and protrusions on the surface. The 2 L reactor was placed in an ultrasonic bath maintained at 65° C., and a dispersion solution of insulating fine particles (10 g of insulating fine particles mixed to be 10% by weight of the conductive particles) was added to the methanol dispersion. Ultrasonic treatment was carried out for 1 hour at 250 rpm to attach the insulating fine particles.

The reactor was naturally cooled, and when the temperature of the ultrasonic bath became 40° C. or lower, the reactor was removed from the ultrasonic bath. The insulation-treated conductive particles were washed 3 times and purified 3 times using methanol. The attachment of insulating fine particles was confirmed using FE-SEM.

Surface Treatment Step:

A 2 L reactor was prepared by adding 600 g of ethanol to 50 g of undried conductive particles with attached insulating fine particles. After stirring the 2 L reactor for 10 minutes, Bis(2-ethylhexyl) phosphate was added to be 1 wt % relative to the conductive particles with attached insulating fine particles. The beaker was then placed in an ultrasonic bath heated to 60° C., and ultrasonic treatment was carried out for 30 minutes. The reaction was terminated when it naturally cooled to 30° C., and the particles were washed 3 times and purified 3 times using methanol. The purified insulation-treated conductive particles were dried using a Spray Dryer. The attachment of insulating fine particles on the dried conductive particles was confirmed using FE-SEM.

Anisotropic Conductive Film Manufacturing Step:

2 g of acrylic resin W116.3 (manufactured by Negami Chemical, trade name), 20 g of phenoxy resin (manufactured by Toto Kasei, trade name), 15 g of acrylic epoxy resin VR-60 (manufactured by Showa Denko, trade name), 0.5 g of thermal initiator BPO, 0.5 g of LPO, and 5 g of epoxy silane coupling agent A-187 (manufactured by Momentive, trade name) were mixed, and then a 50% solid content mixture was made using toluene as a Solvent. The insulation-treated conductive particles were added at a ratio of 8,000 EA per 1 $mm^2$ Area, and then mixed 3 times for 5 minutes using a planetary mixer at 400 rpm revolution and 150 rpm rotation to make an anisotropic conductive paste. The anisotropic conductive paste was coated on a release film to a thickness of 12 μm, then dried in air at 75° C. for 5 minutes using a hot air dryer to produce a final anisotropic conductive film (ACF) with a thickness of 6 μm.

Example 2 conductive particles and anisotropic conductive film were manufactured in the same way as Example 1, except for synthesizing insulating fine particles with a size of 150 nm and a Tg of 110° C. using 1,200 g of ethanol.

Example 3 conductive particles and anisotropic conductive film were manufactured in the same way as Example 1, except for synthesizing insulating fine particles with a size of 220 nm and a Tg of 110° C. using 54 g of polyvinylpyrrolidone (PVP), 1,200 g of ethanol, and 0.8 g of potassium persulfate (KPS).

Example 4 conductive particles and anisotropic conductive film were manufactured in the same way as Example 1, except for synthesizing insulating fine particles with a size of 220 nm and a Tg of 110° C. using 1,200 g of ethanol and 22.5 g of ethylene glycol dimethacrylate (EGDMA).

Example 5 conductive particles and anisotropic conductive film were manufactured in the same way as Example 1, except for synthesizing insulating fine particles with a size of 220 nm and a Tg of 110° C. using 30 g of ethylene glycol dimethacrylate (EGDMA).

Example 6 conductive particles and anisotropic conductive film were manufactured in the same way as Example 1, except for using a solution containing 5 wt % of insulating fine particles from Examples 1 and 3 in equal weight ratio (5:5).

Example 7 conductive particles and anisotropic conductive film were manufactured in the same way as Example 1, except for using a solution made by mixing solutions containing 5 wt % of insulating fine particles from Examples 2 and 3 in a 5:5 weight ratio.

Example 8 conductive particles and anisotropic conductive film were manufactured in the same way as Example 2, except for adding insulating fine particles dispersion at 20 wt % relative to the weight of conductive particles in the insulating fine particles attaching step.

Example 9 conductive particles and anisotropic conductive film were manufactured in the same way as Example 2, except for adding insulating fine particles dispersion at 5 wt % relative to the weight of conductive particles in the insulating fine particles attaching step.

Example 10 conductive particles and anisotropic conductive film were manufactured in the same way as Example 1, except for using dodecane thiol as the surface treatment chemical in the surface treatment process.

Comparative Examples 1 to 10

Using property comparison with surface-treated products, conductive particles with attached insulating fine particles from Examples 1 to 10 were dried using a Spray Dryer without surface treatment, and conductive particles and anisotropic conductive film were manufactured in the same way as Example 1.

Experimental Example

Experimental Example 1

The anisotropic conductive films (ACF) manufactured in Examples 1 to 10 and Comparative Examples 1 to 10 were observed using an Optical microscope to measure the Number of clumped conductive particles. The number of 5 or more Aggregated Aggregates was measured in a 75 cm² Area of the manufactured ACF. The number of Aggregates per total particles is shown in Table 1 in ppm units.

TABLE 1

Evaluation of Aggregation Before and After Surface Treatment

| Surface Treatment Applied (ppm) | | Surface Treatment Not Applied (ppm) | |
|---|---|---|---|
| Example 1 | 0.12 | Comparison Example 1 | 20.2 |
| Example 2 | 0.08 | Comparison Example 2 | 25.75 |
| Example 3 | 0.07 | Comparison Example 3 | 27.42 |
| Example 4 | 0.03 | Comparison Example 4 | 40.83 |
| Example 5 | 0.00 | Comparison Example 5 | 35.83 |
| Example 6 | 0.12 | Comparison Example 6 | 33.08 |
| Example 7 | 0.08 | Comparison Example 7 | 29.78 |

TABLE 1-continued

Evaluation of Aggregation Before and After Surface Treatment

| Surface Treatment Applied (ppm) | | Surface Treatment Not Applied (ppm) | |
|---|---|---|---|
| Example 8 | 0.08 | Comparison Example 8 | 28.08 |
| Example 9 | 0.05 | Comparison Example 9 | 31.3 |
| Example 10 | 0.08 | Comparison Example 10 | 27.42 |

Experimental Example 2

Figure 1:
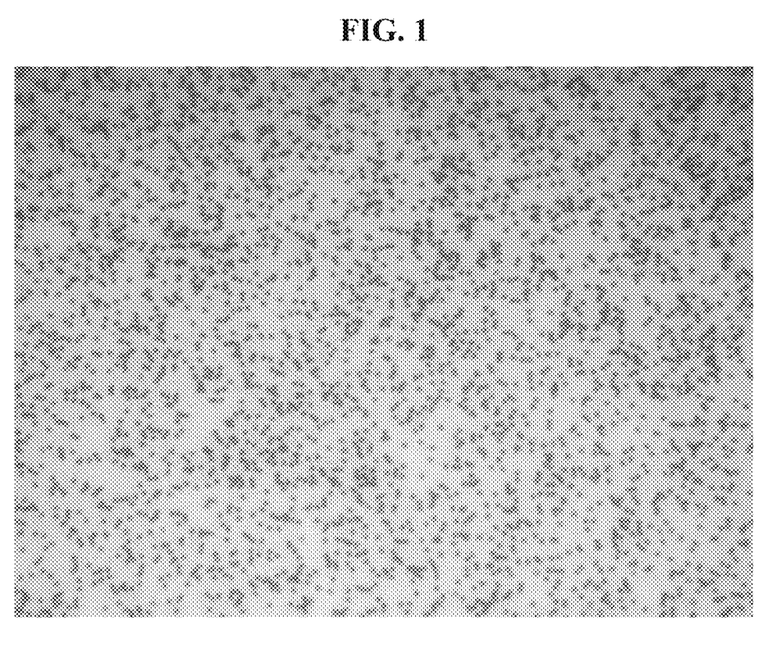
FIG. 1 is a dispersion photograph of conductive particles within an ACF using insulated conductive particles according to an embodiment of the present invention.
Figure 2:
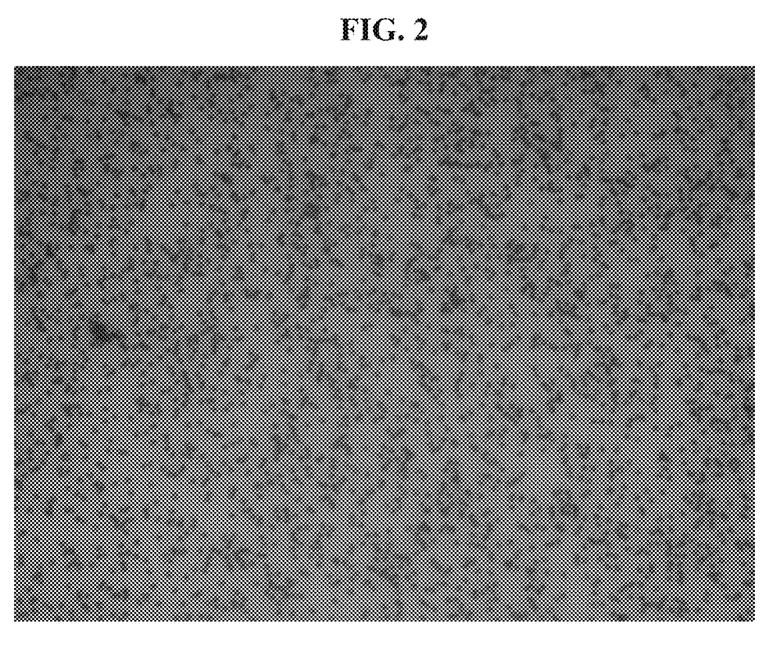
FIG. 2 is a dispersion photograph of conductive particles within an ACF using insulated conductive particles for comparison.

Optical photographs of conductive particles dispersed in anisotropic conductive films from Example 1 and Comparative Example 1 were taken and shown in FIGS. 1 and 2. According to this, it can be confirmed that there is no aggregation phenomenon in the case of FIG. 1, where conductive particles from Example 1 are dispersed, compared to FIG. 2, where conductive particles from Comparative Example 1 are dispersed.

Experimental Example 3

Figure 3:
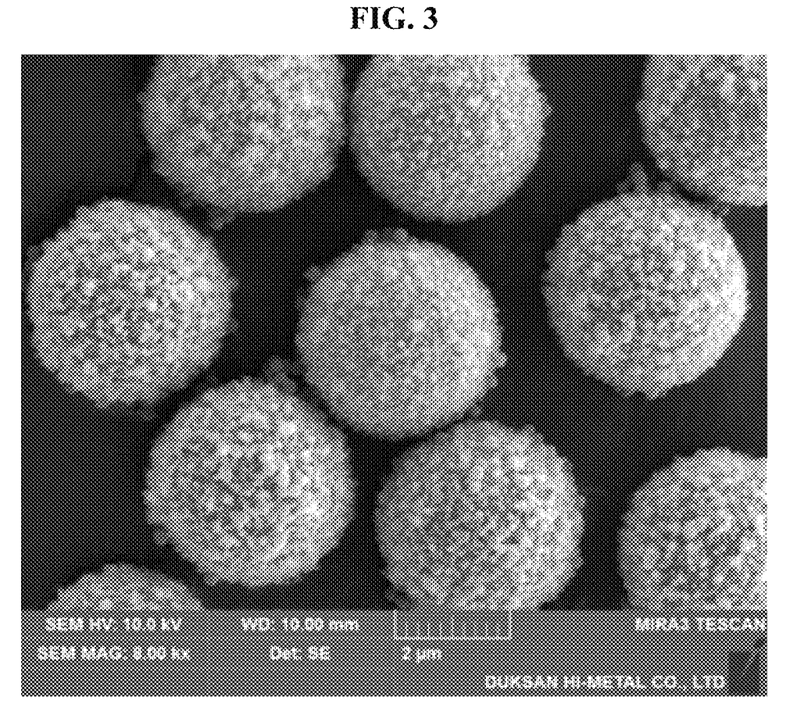
FIG. 3 is an SEM photograph of conductive particles with attached insulating fine particles.

An SEM photograph of conductive particles with attached insulating fine particles from Example 1 was taken and shown in FIG. 3.

The features, structures, and effects described in the above examples can be combined or modified by those skilled in the art for other embodiments, and such combinations and modifications should be interpreted as included within the scope of the present invention.

What is claimed is:

1. A conductive particle to be dispersed in a resin composition of an anisotropic connection material comprising a binder resin and a solvent, the conductive particle comprising:
    a core;
    a metal-containing conductive layer provided on the core;
    insulating fine particles provided in a first region on the conductive layer, the insulating fine particles comprising a first substituent having ability to bind to a metal in the conductive layer so that the insulating fine particles are attached to a surface of the conductive layer via the first substituent; and
    a hydrophobic surface treatment layer provided in a second region on the conductive layer, the hydrophobic surface treatment layer comprising a second substituent having ability to bind to the metal in the conductive layer so that the hydrophobic surface treatment layer is attached to the surface of the conductive layer via the second substituent,
    wherein the first and second regions do not overlap each other.

2. The conductive particle of claim 1, wherein the insulating fine particles have a height in a range of 100 to 300 nm.

3. The conductive particle of claim 1, wherein the first substituent is at least one selected from the group consisting of a hetero group, an ether group, a carbonate group, and a hydroxyl group.

4. The conductive particle of claim 1, wherein the second substituent is at least one selected from the group consisting of a thiol group, a phosphate group, and a phosphate ester group.

5. The conductive particle of claim 1, further comprising protrusions provided on the conductive layer.

6. The conductive particle of claim 5, wherein one or more of the insulating fine particles are provided on the protrusions.

7. The conductive particle of claim 5, wherein the surface treatment layer is provided on the protrusions.

8. The conductive particle of claim 5, wherein a diameter of the insulating fine particles is larger than a height of the protrusions.

9. An anisotropic conductive material provided as an anisotropic conductive film comprising:
- a plurality of conductive particles,
- wherein each of the plurality of conductive particles includes:
- a core;
- a metal-containing conductive layer provided on the core;
- insulating fine particles provided in a first region on the conductive layer, the insulating fine particles comprising a first substituent having ability to bind to a metal in the conductive layer so that the insulating fine particles are attached to a surface of the conductive layer via the first substituent; and
- a hydrophobic surface treatment layer provided in a second region on the conductive layer, the hydrophobic surface treatment layer comprising a second substituent having ability to bind to the metal in the conductive layer so that the hydrophobic surface treatment layer is attached to the surface of the conductive layer via the second substituent, wherein the first and second regions do not overlap each other, and wherein the number of aggregates in each of which five or more of the conductive particles are aggregated is 0.2 ppm or less per area of 75 $cm^2$ when measured using an optical microscope.

* * * * *